Sept. 1, 1953     R. E. RISSER, JR     2,650,776
HOSE RETRACTION ASSEMBLY
Filed Jan. 28, 1948     4 Sheets-Sheet 1

Inventor:
Ross Eugene Risser, Jr.
By Hinkle, Horton, Aleberg, Hanmann & Wapper
Attorneys.

Sept. 1, 1953 R. E. RISSER, JR 2,650,776
HOSE RETRACTION ASSEMBLY
Filed Jan. 28, 1948 4 Sheets-Sheet 2

Inventor:
Ross Eugene Risser, Jr.
By Hinkel, Horton, Ahlberg, Hausmann & Wupper
Attorneys.

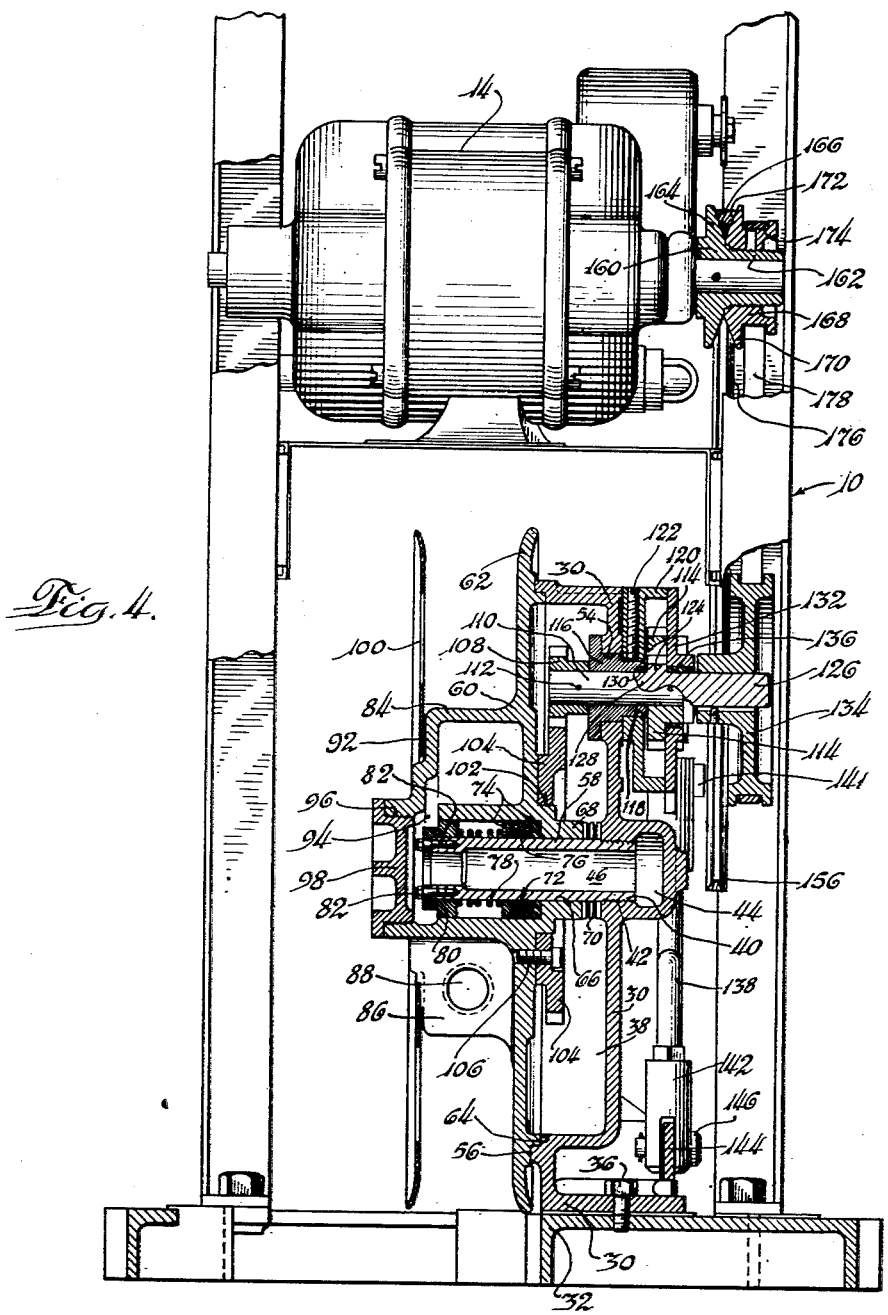

Patented Sept. 1, 1953

2,650,776

UNITED STATES PATENT OFFICE 2,650,776

HOSE RETRACTION ASSEMBLY

Ross Eugene Risser, Jr., Bonham, Tex.

Application January 28, 1948, Serial No. 4,782

2 Claims. (Cl. 242—86)

1

My invention relates to a hose retraction assembly for filling station gasoline pumps. The desirability of housing the hose of a gasoline pump within the pump has been long recognized. It improves the appearance of the pump and station, safeguards the hose, and permits the use of a longer hose than that possible with the external suspension now commonly used. However, when this self contained storage is desired, a retraction mechanism is an essential element of the pump. To be most satisfactory, the retraction device should permit a free withdrawal of the hose and have no retracting force acting while the hose is in use and yet provide a positive and certain retraction when desired.

One object of my invention, therefore, is to provide a novel assembly for a motor fuel pump which, while permitting free withdrawal and easy retention of the hose, will retract the hose when the operator so desires.

Another object is to provide a novel hose retraction assembly which is motor actuated to afford positive, strong, and sure response.

Yet another object is to provide a novel hose retraction assembly which is powered by the pumping motor of the pump.

Other objects and advantages of my invention will be apparent from the following description and drawings, of which:

Fig. 4 is a sectional view which may be considered as being taken substantially along the line 4—4 of Fig. 3 looking in the direction of the arrows.

Figure 1:
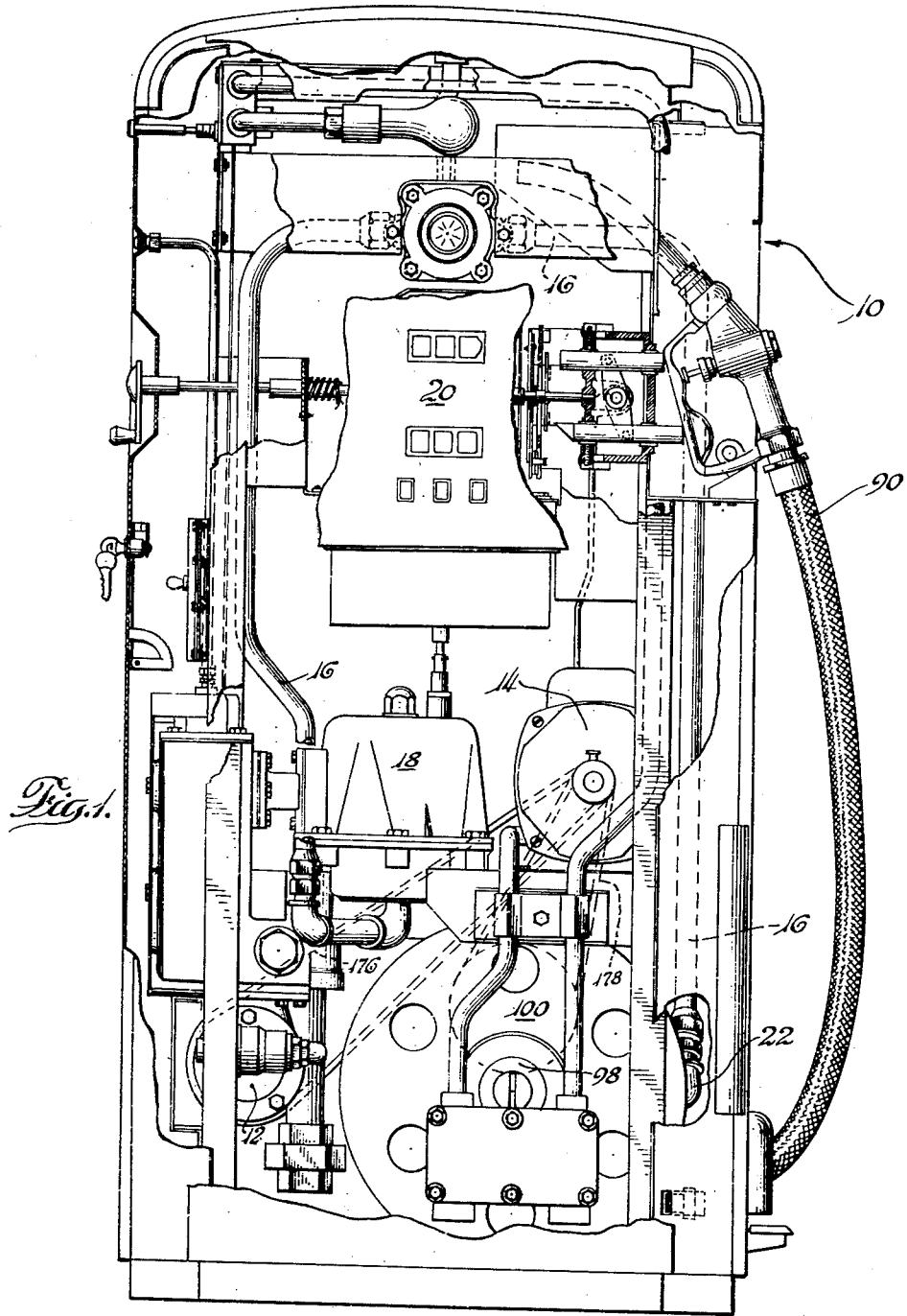
Fig. 1 is an elevational view of the face of a pump incorporating my device with the cover substantially cut away.
Figure 2:
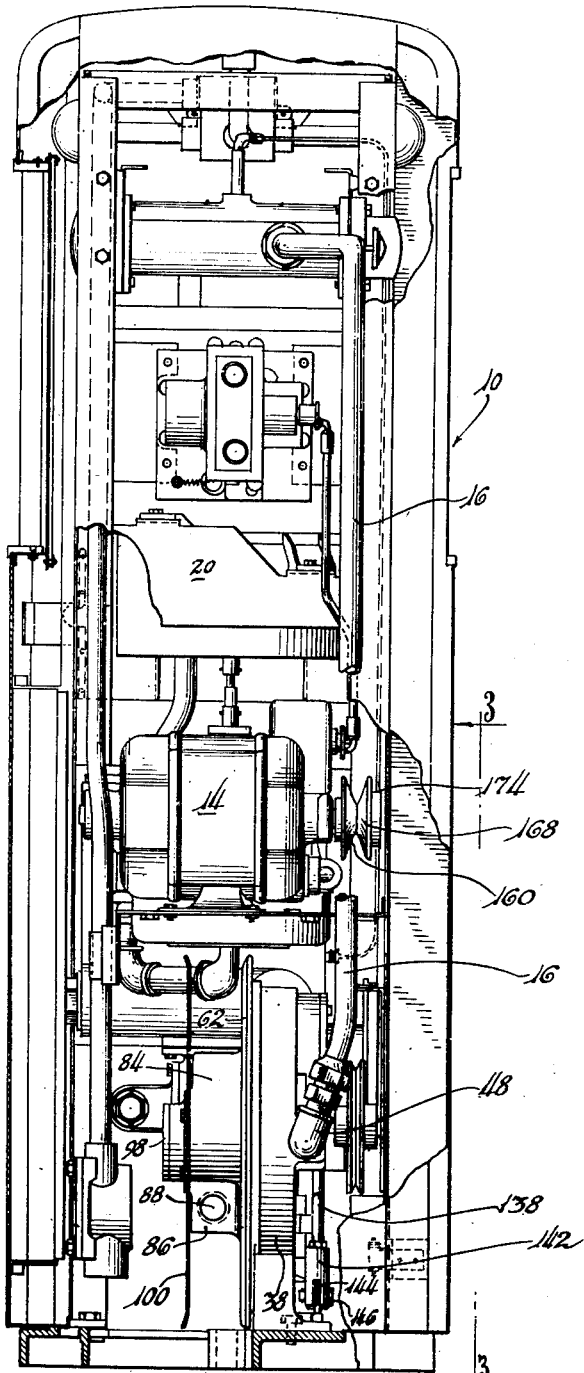
Fig. 2 is an elevational view of the right side of the pump shown in Fig. 1 with the cover substantially cut away.

My invention is intended to be incorporated in a gasoline pump 10 which may otherwise be conventional and which has a pump unit 12 powered by a motor 14. The pump withdraws gasoline from a reservoir (not shown) and circulates it via a line 16 through a meter 18 which operates a recorder 20 and to a point at which my invention may be introduced into the structure.

My invention comprises a stationary housing 30 which is secured to the floor 32 of the pump 10 by bolts 36 or by any other suitable means. Upwardly of the floor the housing is formed to pro-

2 vide a shallow, substantially cylindrical recess 38 which serves the purpose of defining a retraction gear case. A smaller recess 40 is formed approximately centrally in the case 38 and is threaded internally as at 42 to provide a reel spindle seat. An opening 44 is formed in the side adjacent the bottom of this recess which communicates with the passage 46 formed integrally with the housing. The other end of the passage is internally threaded to receive an elbow 48 which in turn connects the retraction assembly with the fuel line 16 and pump 12.

Upward of the reel spindle seat 40 a cylindrical gear spindle opening 54 is formed in the retraction gear case. The edge 56 of the retraction gear case is machined to furnish a bearing surface for the hose reel. A tubular reel spindle 58 is threaded into the reel spindle seat and a hose reel body 60 is rotatably mounted thereon.

The hose reel body comprises the inner wall 62 of the reel which has on its reverse side a bearing surface 64 adapted to cooperate with the surface 56 to provide additional support for the reel other than the spindle 58. A central opening 66 is formed in the wall defined by a flange 68 which serves as a bearing for the rotation thereof about the spindle. Ball thrust bearings 70 are interposed on the spindle between the bearing flange 68 and the spindle seat. On the side of the wall opposite to that from which the bearing flange 68 projects, a packing gland 72 is formed coaxial with the opening 66 and having a larger diameter than the bearing flange. When the hose reel body is properly positioned, the packing gland coaxially surrounds the free end of the spindle leaving an annular recess between these members. Annular packing rings 74 are seated in the recess and embrace pliable rings of packing material 76. The rings are loaded by a spring 78, the opposite end of which bears against an annular member 80 overlying the end of the reel spindle 58 and secured thereto by screws 82. The hose hub is formed as a flange 84 which projects outward from the wall 62 on the same side as the packing gland 72 and preferably comprises one turn of a spiral with a radial wall 86 joining its ends. This wall has a tapped hole 88 through it to which the hose 90 may be secured. The hub flange continues from its outstanding portion 84 radially inward parallel to the wall 62 as at 92 to approach closely the end of the packing gland 72. Sufficient space remains, however, to leave a passage 94. From this point the flange again extends outward and is threaded at 96 to receive a cap 98 concentric with the spindle 58. A circular cover plate 100 is secured to the hub flange portions 92, and serves as the other wall of the reel.

The hose reel body has a shoulder 102 formed thereon at the juncture of the wall 62 and the bearing flange 68 coaxial with the latter. On this is mounted a driven gear 104 secured to the body by screws 106 or other suitable means. This gear is meshed with the intermediate pinion 108. The pinion 108 is mounted on a gear spindle 110 by a pin 112. The spindle carries an intermediate gear 114 on its other end and a bushing 116 intermediate the pinion and the gear. The bushing 116 is rotatably fitted into the spindle opening 84 of the housing. Thus, the spindle 110 is rotatable relative to the housing. The bushing 116 fits into the housing so as to have an integral portion 118 thereof projecting outwardly thereof. To this is fitted a gear case 120, the two being secured together by a set screw 122. The gear case is, therefore, rotatable with the bushing relative to the housing 30. The intermediate gear 114 is situated in the housing. A driving pinion 124, formed integrally and coaxially with a pulley spindle 126, is also enclosed in the gear case in mesh with the intermediate gear 114.

Figure 3:
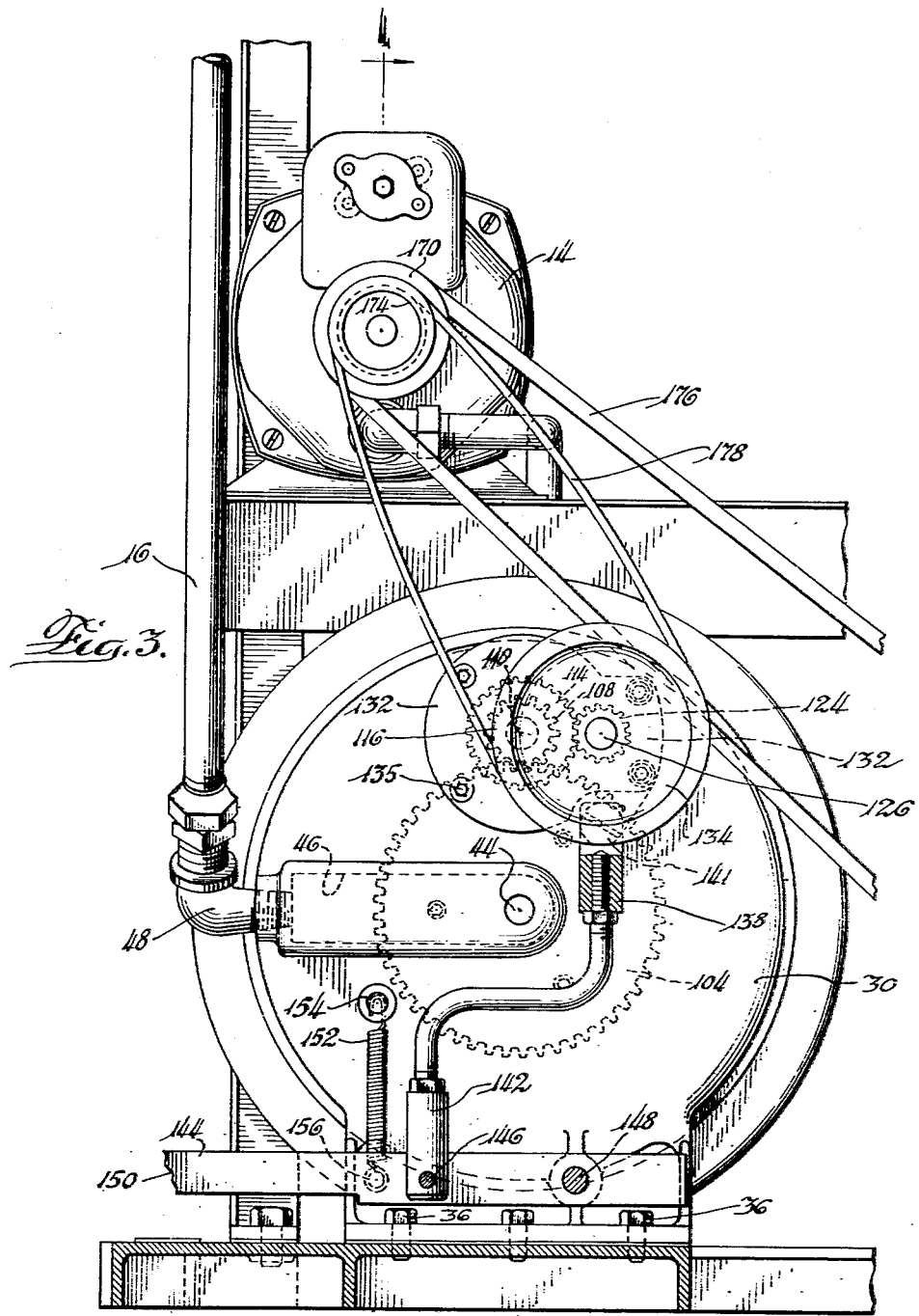
Fig. 3 is an enlarged elevational view of my invention which may be considered as being taken over the span of and in the direction of the arrows 3—3 of Fig. 2.

The spindle 126 is formed to have a stub end 128 journaled in a bearing equipped recess 130 in the inner wall of the gear case and a longer projection on the other side of pinion 114 which passes through a gear case cover 132 and has a pulley 134 mounted thereon. The cover is secured to the gear case 120 by bolts 135. The opening in the gear case cover has a bearing sleeve 136 therein to receive the pulley spindle. The shape of the gear case may be best seen in Fig. 3. The spindles 110 and 126 are parallel and in substantially the same horizontal plane. The gear case houses the gear 114 and the pinion 124 which are constantly meshed. It is pivotally affixed to the housing by the spindle 110. The part of the case, therefore, which houses the pinion 124 may move arcuately up and down carrying the pinion, the spindle 126, and the pulley 134 with it about the center 110.

A shift rod 138 is pivotally secured to the gear case at one end as by a bolt 141 or other suitable means at a point under the spindle 126. At the other end a fork 142 is secured to the rod which in turn is linked to a pedal lever 144 by a pin or bolt 146. The fork engages the lever between a pivot 148 secured to the housing and the free end 150 thereof. A tension spring 152 is connected between a pin 154 on the housing and a pin 156 on the pedal lever to maintain the shift rod in its upper position when no force is being applied to it.

The retraction assembly is powered by the pump motor 14, a double belt pulley 160 being provided on the shaft of the motor. This pulley comprises an externally threaded shaft 162 adapted to be fitted over the motor shaft and having an integral flange 164 formed thereon adjacent to the motor. The flange surface 166 away from the motor is inclined to provide one side of a V belt groove. An adjustment member 168 having a threaded central opening adapted to be received on shaft 162 is secured thereto. This member has a flange 170 formed on the inner end thereof whose inner surface 172 is inclined to complete the V belt groove. Outwardly of the flange a flat belt groove 174 is provided. The pump is furnished with a V belt 176 which drives the pumping mechanism, and a flat belt 178 which drives the retraction mechanism.

In operation the hose retracting assembly embodying my invention functions in the following manner. In the rest position when no force is exerted on the lever 144 the spring will hold it in its uppermost position. The lever in turn holds the shift rod 138 in its upper position which rotates the gear case about spindle 110 to move the pulley 134 from tight or driving engagement with the belt 178 so that the belt may rest loosely upon the pulley. As the motor is started the V belt remains in tight engagement with the motor and pump whereas the flat belt is loose and will transmit no power to the hose reel. The hose may hence be withdrawn and held while filling an automobile gasoline tank without any retracting force being exerted by the assembly.

To retract the hose, the operator steps on the pedal lever 144, it being understood that the means of actuation may well be a manual lever or any other appropriate means. This has the effect of rotating the gear case 120 downwardly about the spindle 110 which places the pulley in tight driving engagement with the belt 178.

Power is transmitted from the motor which remains in continuous operation by the pulley through the driving pinion 124, the intermediate gear 114 and pinion 108 and the driven gear 104 to the reel body 60, retracting the hose.

The course of flow of the gasoline through this device is as follows: The passage 46 is connected by the elbow 48 to the gasoline line 16. The fuel enters the elbow and flows through the passage to the end thereof which overlies the reel spindle seat. It then moves through the seat and tubular spindle 56 and out into the passage 94 and the hub 84. The packing 76 effectually prevents leakage of the fuel out of the apparatus. From the hub it flows out of opening 88 and into the hose.

The double belt pulley 160 serves an important function in the assembly. In adjusting the unit for operation the motor must be positioned and the flat belt selected so that the belt will tighten on the pulley sufficiently near the end of the stroke of the pedal lever that the lever's movement will be stopped by the casting at point 180 to avoid undue strain on the bearings. The positioning of the motor, therefore, relative to the retraction assembly may result in an incorrect spacing between the motor and the pump for a standard V belt. This may be corrected by turning the adjustment member 168 on the shaft 162 to make surface 172 approach or recede from surface 166. In this fashion the effective diameter of the V belt groove is changed to shorten or lengthen the effective length of the belt.

While I have shown and described a preferred embodiment of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. A hose retracting assembly for use with a fluid pump having a motor and a hose for delivering the fluid output of the pump, said assembly comprising a reel for storing the hose and conveying fluid to said hose, gear means for driving said reel comprising an element supporting a pair of shafts, and a pair of gears mounted on said shafts, said pair of gears being in engagement and rotatable about the axis of one gear of said pair, a pulley on the shaft of the other gear of said pair, a belt extending between said pulley and said motor for the transmission of power to said pulley from said motor, and means for pivoting said element to place said belt in driving engagement with said pulley, wherein the said other of said pair of gears drives said remaining gear means to power said reel.

2. A hose retracting assembly for a fluid pump having a motor and a hose for delivering the output of said pump, said assembly comprising a reel for storing the hose and conveying fluid to said hose, a driving system for said reel including a driven gear and a shaft therefor, a member pivotally journaled on said shaft, a driving gear, a shaft for said driving gear journaled on said member such that said driving gear and said driven gear are permanently meshed and that said driving gear is capable of planetary motion about said driven gear, a pulley on said driving gear shaft, a belt extending between said motor and said pulley for transmitting power from said motor to said pulley, and means for rotating said member about said driven gear shaft to place said pulley in driving engagement with said belt.

ROSS EUGENE RISSER, JR.

References Cited in the file of this patent

UNITED STATES PATENTS

| Number | Name | Date |
|---|---|---|
| 975,869 | Jones | Nov. 15, 1910 |
| 1,408,421 | Facchi | Feb. 28, 1922 |
| 1,499,644 | Dowrelio | July 1, 1924 |
| 2,069,245 | Haines | Feb. 2, 1937 |
| 2,193,251 | Johnson | Mar. 12, 1940 |
| 2,255,180 | Marvel | Sept. 9, 1941 |
| 2,315,085 | Churchward | Mar. 30, 1943 |
| 2,339,668 | Baldwin et al. | Jan. 18, 1944 |
| 2,427,943 | Butterworth | Sept. 23, 1947 |
| 2,495,392 | Smith | Jan. 24, 1950 |